July 9, 1963 C. L. CARLSON ETAL 3,096,577

METHOD OF MAKING ALUMINUM CLAD COPPER WIRE

Original Filed Jan. 12, 1956

WITNESSES:

Bernard R. Gieguez

James F. Young

INVENTORS
Charles L. Carlson and
Stanley A. Rosecrans.
BY
Frederick Shapoe
ATTORNEY 3,096,577

METHOD OF MAKING ALUMINUM CLAD COPPER WIRE

Charles L. Carlson, Irwin, and Stanley A. Rosecrans, Pittsburgh, Pa., assignors to Westinghouse Electric Corporation, East Pittsburgh, Pa., a corporation of Pennsylvania Original application Jan. 12, 1956, Ser. No. 558,699, now Patent No. 2,947,069, dated Aug. 2, 1960. Divided and this application June 9, 1960, Ser. No. 35,031
5 Claims. (Cl. 29—473.3)

This invention relates to the preparation of composite flexible wire and the like comprising a core of copper and an external sheath of aluminum metallurgically bonded thereto, and processes for producing the same.

This application is a division of our U.S. patent application Serial No. 558,699, filed January 12, 1956, now Patent 2,947,069, and assigned to the same assignee.

It has long been desirable to produce wire, strip, rod and similar elongated members comprising a core of copper or copper base alloy with a relatively thin sheath of aluminum applied to the exterior surfaces thereof. It has been highly difficult to produce a satisfactory composite aluminum clad copper wire member heretofore. At the interface of the copper and the aluminum interdiffusion takes place with the formation of a layer of brittle intermetallic compounds. This layer can form readily at moderate temperatures, particularly during wire enameling operations, during processing, or in electrical equipment operating at elevated temperatures. The layer of brittle intermetallic compound which so forms shatters readily on flexing of the composite wire, and the aluminum will sleeve and separate under moderate elongation. It is difficult to produce a well bonded, uniformly thin aluminum sheath or coating on copper wire which will withstand normally expected use.

Copper wire provided with a metallurigcally bonded aluminum sheath at the surface has numerous desirable properties, particularly for the electrical industry. Thus, enamels of all kinds including the conventional organic compositions and the silicone resins when applied to aluminum surfaced wire will last many times longer at any given elevated temperature than will the same enamel applied to a copper surfaced wire. The advantages of aluminum surfaced wires and other elongated members are particularly adavntageous at elevated temperatures of use to which many forms of electrical equipment may be subjected in service. As electrical equipment is subjected to more severe service conditions and expected to operate at higher outputs, the operating temperatures are increased accordingly. The use of aluminum surfaced conductors will enable a very substantial increase in operating temperatures for a given life of electrical equipment or for a longer life at the same temperature as compared to copper conductors.

Since the electrical conductivity of a copper conductor is much greater than the same cross section of an aluminum conductor, it is desirable from a space factor standpoint to employ a copper conductor in place of an aluminum conductor. However, the benefits of high electrical conductivity per unit cross section of area with good resistance to deterioration at elevated temperatures are obtained by having available a composite conductor wherein the major portion of the cross section comprises copper with a relatively thin exterior sheath of aluminum. Ordinarily the conductor should comprise from 80% to 95% of copper and the balance being aluminum.

The problem of providing composite wire and similar elongated members comprising a copper core and a thin aluminum surface layer has taxed the skill and ingenuity of those expert in the art with little success. Such products as have been produced have been poorly bonded and have been lacking in flexibility. In many cases the products have required extremely costly and involved processing and even so have not been satisfactory.

The object of the present invention is to provide a process for producing composite elongated members and wire wherein a copper core comprises the major portion of the cross section with a relatively thin surface layer of aluminum metallurgically bonded thereto by means of a barrier layer of silver, such members being suitable for use in electrical apparatus.

A further object of the invention is to provide a composite wire comprising a core of copper, a barrier layer of silver and a thin sheath of aluminum metallurgically bonded thereto.

A further object of the invention is to provide a process for producing composite aluminum clad copper wire by simple cold working operations from a copper rod and an applied aluminum sleeve.

Other objects of the invention will in part be obvious and will in part appear hereinafter. For a better understanding of the nature and objects of the invention, reference should be had to the following detailed description and drawing in which.

Figure 1:
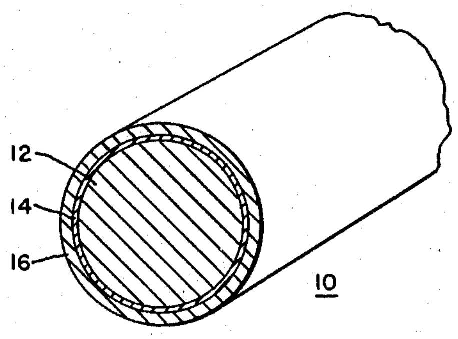
FIGURE 1 is a view in perspective, partly in section, of a composite circular conductor.

We have discovered processes for producing flexible, well-bonded, composite elongated members comprising a copper core, a thin barrier layer of silver and a thin sheath of aluminum. By this process the composite member may be produced rapidly and economically. The composite members have proven highly satisfactory for use either as enameled wire or in other applications in the electrical industry.

More particularly, we have discovered that an aluminum sheath may be applied to a copper core and metallurigcally bonded thereto, providing a thin barrier layer of silver is applied between the copper and the aluminum. In addition, we have discovered certain techniques for successfully working an initially prepared assembly comprising an aluminum sleeve disposed over a silver clad copper rod to any desired size or shape of wire, bar, strip or other elongated member.

More particularly, a copper rod or bar of suitable diameter, for example a circular rod of a diameter of from 0.25 inch to 2 inches, is cleaned to remove dirt, grease, oxides and other surface imperfections. The cleaned copper rod is then provided with an imperforate layer or coating of silver. The silver may be sprayed thereon, or several layers of silver foil wrapped on the rod. We have secured excellent results when the copper rod is electroplated with silver to provide thereon from 0.005 to 0.25 inch of silver. It will be understood that the silver is plated on the rod in accordance with conventional techniques. Such plating will ordinarily comprise initially plating the cleaned copper rod in a silver strike solution which comprises from 0.5 to 0.7 ounce per gallon of silver cyanide and 8 to 10 ounces per gallon of sodium cyanide, the silver being plated at a current density of from 15 to 25 amperes per square foot. After plating for a few minutes, or up to 5 to 10 minutes, in the silver strike solution, the rod is further plated in a conventional silver cyanide plating bath which may comprise from 3 to 5 ounces per gallon of silver cyanide, 4 to 8 ounces per gallon of an alkali metal cyanide such as sodium cyanide or potassium cyanide, and some alkali metal carbonate present in the solution ordinarily in amounts of the order of 6 ounces per gallon, with the plating being carried out at current densities of from 5 to 15 amperes per square foot. It will be understood that numerous other silver plating baths and procedures may be employed to apply the required thickness of silver on the copper rod. The thickness of the silver will be from about 1% to 12% of the diameter of the copper rod, and preferably from 5% to 10%.

The copper rod with the applied silver thereon is disposed within a sleeve or tube of aluminum. It may be slipped within a previously prepared aluminum tube which has an inner diameter slightly larger than the diameter of the electroplated rod in the case of a circular rod. The silver plated rod may be from 10 to 25 feet in length and the aluminum tube may be slightly longer, these lengths being exemplary. The wall thickness of the aluminum tube is such that its cross-sectional area is at least 5% of the cross-sectional area of the copper core. Usually the tube wall will be between 0.01 inch to 0.25 inch.

In some cases the silver plated copper rod may be covered with an aluminum sleeve by extruding or casting the aluminum thereon. The silver plated copper rod is passed through a hollow extrusion die and a closely fitting sleeve or sheath aluminum at a temperature of 350° C. to 500° C., for example, is extruded thereon.

For electrical applications the copper rod will be a tough pitch or an oxygen-free high conductivity copper. However, the rod may comprise copper base alloys having small amounts of various alloying constituents to provide for desired electrical or physical characteristics. For example the copper rod may contain up to 0.2% by weight of silver alloyed therewith. The aluminum tube or sleeve may comprise pure aluminum of the electrical conductivity grade or aluminum base alloys comprising up to 10% by weight of alloying constituents. We have obtained good results using aluminum alloy tubing comprising (*a*) 98.9% aluminum, 0.4% magnesium and 0.7% silicon; and (*b*) 99% aluminum and 1% manganese.

The assembly of the aluminum tube or sleeve with the silver plated copper rod is then cold worked by swaging or drawing in order to reduce the cross-sectional area thereof by a substantial amount of the order of 30 to 40%. The cold working should reduce the cross-sectional area of the composite tube to a value substantially less than that of the cross-sectional area of the original copper rod. The cold working operation will shrink the aluminum tube into a close and intimate contact with the silver layer. We have secured good results by cold working an assembly comprising an aluminum tube of an external diameter of 0.46 inch and an internal diameter of 0.40 inch within which is placed a copper bar of a diameter of 0.35 inch plated with 0.025 inch thickness of silver, to a worked diameter of approximately 0.25 inch. We have annealed this initially cold worked composite assembly for a period of from 10 to 20 minutes at a temperature of from 350° C. to not exceeding 500° C. Annealing may improve the bond between the aluminum and silver and the silver and copper.

After the initial cold working of the larger diameter copper rod, such as from 1 to 2 inches in diameter whereon the applied aluminum tube has a wall thickness of from 0.1 to 0.25 inch, the diameter will be about ⅜ inch. The composite member after this initial cold working may be die shaved to remove surface imperfections before being drawn further to fine wire sizes. The aluminum tube originally used is of a sufficiently heavy wall thickness to allow for the die shaving losses.

A caustic etch in 5% aqueous sodium hydroxide may be employed to remove slivers or other imperfections in the aluminum sheath at any time in the drawing operation.

The initially cold worked composite assembly is then preferably subjected to a series of wire drawings through dies. Each of the dies is preferably constructed to reduce the cross section of the assembly to an extent greater than the cross-sectional area of the aluminum sheath alone in passage through the die. We have found that if the die drawing is so conducted that the dies will reduce the wire less than the cross-sectional area of the aluminum that there will be a strong tendency to strip the aluminum from the copper. Consequently, it is highly critical that each wire drawing be drastic. The drastic wire drawing reduces both the aluminum sheath and the copper core in substantially uniform proportions. The silver layer, of course, is also reduced in cross-sectional area with each drawing. It will be appreciated that the wire may be annealed during the process, if such is required, by heating for a few minutes at a temperature of, for example, 400° C. Ordinarily we have been able to reduce wire to a diameter of 0.045 inch from 0.25 inch diameter stock without any annealing. However, finer sizes of wire, for instance sizes 30 to 40 AWG, may require at least one intermediate annealing to relieve stresses before drawing to final size.

We have found that the silver barrier layer is critically necessary in producing the composite wire of the present invention. While the primary function of the silver barrier layer is to prevent the formation of layers of brittle intermetallic compounds between the aluminum and copper, it also serves other vital requirements. As the composite member is drawn, the relative hardness of the aluminum, silver and copper at all times is such that the silver has a hardness intermediate between that of aluminum and copper. Thus, while the pure annealed metals having hardness (Rockwell F) of 19 for aluminum, 24 for silver and 38 for copper, after a 60% cold reduction, the hardness of the aluminum is 38, the silver 90 and the copper 110. The maintenance of such intermediate hardness values for the silver are highly desirable in producing a satisfactory composite wire. A metal having a hardness that exceeds that of copper, for example, may tend to promote separation of the core and the sheath. Another characteristic of silver which enables the present invention to be successfully carried out is its modulus of elasticity value of $11\times10^6$, which is intermediate the modulus value of $10\times10^6$ for aluminum and $16\times10^6$ for copper. An outstanding property is that the silver bonds metallurgically, on cold working alone, to both aluminum and copper. Consequently, there is good adhesion between the three components at all times.

We have found that the aluminum tube or sleeve need only be cleaned in a chemical cleaner before being applied over the silver plated copper bar, and excellent bonding will take place as cold working shrinks the aluminum onto the core and eliminates all spaces. In some instances we have treated the aluminum in a standard zincate solution after having cleaned the aluminum and then applied the zincate coated aluminum over the silver plated copper rod. A good metallurgical bond was obtained in this latter case also.

We have produced quantities of composite wire comprising the aluminum sheath with the silver plated core metallurgically bonded thereto. Such wire has possessed excellent surface characteristics which will enable it to be employed in making many types of electrical equipment. In some instances the aluminum-clad copper wire may be introduced into apparatus without any further treatment. In other instances we have anodized the aluminum sheath and the anodized composite product may be employed in electrical equipment with success. However, the most useful products were obtained by enameling the aluminum sheathed composite product both with and without anodizing of the aluminum before the enamel is applied. In enameling towers the composite wire is exposed to temperatures of the order of 400° C. and this temperature stress relieves and anneals the cold drawn product while it is being coated with the enamel. We have applied to such composite wire various organic enamels including polyvinyl formal-phenolic wire enamels, silicone enamels, silicone-polyesteramide enamels, and emulsions of polytetrafluoroethylene. All of these coated wires have been tested and the applied resinous enamel coatings were found to have a life at elevated temperatures much greater than the life exhibited by a similar all copper wire coated therewith.

Referring to FIG. 1 of the drawing, there is illustrated a composite conductor 10 produced in accordance with the invention. The conductor comprises a core 12 of copper or copper base alloy. A thin barrier layer of silver of a thickness of from 0.0001 to 0.001 inch covers the surface of the copper core. A sheath 16 of aluminum or aluminum base alloy comprising from 5% to 20% of the cross-sectional area of the conductor 10 covers the exterior surface and is metallurgically bonded to the silver layer 14.

Ordinarily the wire drawing dies produce round wire. In some instances, however, it is desirable to have wire of square rectangular cross section. We have taken the round wire and have passed it through suitable rolls to produce either rectangular wire or square wire as desired. We have found no separation of the aluminum from the silver clad copper core even under drastic flattening treatment.

Figure 2:
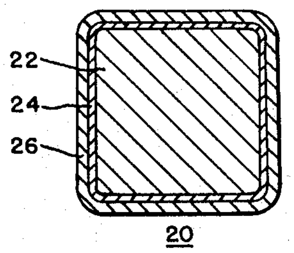
FIG. 2 is a cross-sectional view through a square form of composite conductor.

In FIG. 2 of the drawing is shown a rectangular cross-section wire 20 comprising a rectangular core 22 of copper, a silver layer 24 of a similar thickness to the layer 14 of FIG. 1, and a sheath 26 of aluminum or aluminum alloy metallurgically bonded to the silver layer. The rectangular wire 20 may be prepared by passing round wire through sets of flat rolls operating at right angles to one another whereby to shape the round wire into the square shape shown, wherein the corners are rounded.

Figure 3:
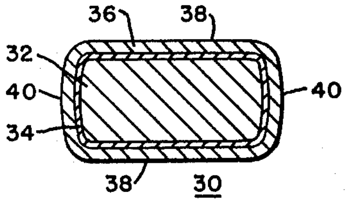
FIG. 3 is a cross section through a rectangular cross section composite conductor.

Referring to FIG. 3, there is illustrated a rectangular shaped wire 30 which has been produced by rolling round wire such as 10 of FIG. 1 between rollers. The wire 30 comprises a core 32 of copper alloy, a silver layer 34 and an aluminum sheath 36 which comprises flat upper and lower surfaces 38 and more or less rounded sides 40.

The following example is illustrative of the practice of the invention. Tough pitch copper rod of a diameter of 0.35 inch was silver plated with silver to a thickness of 0.025 inch, the overall diameter of the silver plated copper being 0.40 inch. A length of the silver plated copper rod was inserted into a tube of aluminum alloy having an internal diameter of 0.40 inch and an external diameter of 0.46 inch. The tube was slightly larger than the silver plated copper rod so that the rod could be inserted readily therein. The assembly was cold drawn through two dies in tandem to a diameter of 0.25 inch. The assembly when so reduced in thickness was examined under a microscope and found to exhibit a close and intimate contact between the aluminum and the silver layer. The assembly was then stress relieved by heating for 10 minutes at 400° C. Thereafter the composite member was wire drawn through a series of 13 wire drawing dies in which the reduction in area was at least 19% and in some cases 30% of the cross-sectional area during each draw. The dies were metal carbide dies in which the die angles varied from 16° to 20°. In each case the reduction in area exceeded the cross-sectional area of the aluminum in the composite member immediately before passage through the die. The aluminum was treated with various die drawing lubricants which comprised mineral oil and in some cases the oil was admixed with graphite. The final drawn wire had a diameter of 0.045 inch (No. 17 AWG). Measurements of this wire indicated that the silver layer was of a thickness of 0.0005 inch and the aluminum was approximately 10% of the cross-sectional area of the conductor. Electrical tests indicated that the wire had approximately 92% of the conductivity of the equivalent all-copper conductor.

We have found that the practical minimum amount of aluminum in the final conductor for wire sizes finer than No. 14 AWG is approximately 8% of the total cross-sectional area. With extreme care the aluminum sheath may comprise as little as 5% of the total cross-sectional area of the composite conductor. When the aluminum sheath exceeds 20% of the cross-sectional area of the conductor such drastic reduction in each pass through the wire drawing die is required that difficulties are had in processing. Consequently, the aluminum will ordinarily comprise between 5% and 20% of the total cross section of the composite conductor.

Figure 4:
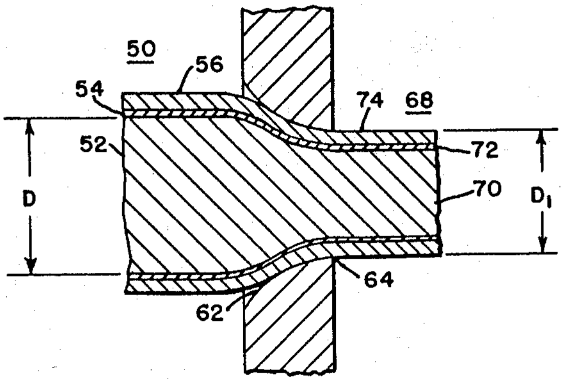
FIG. 4 is a vertical section through a drawing die in which the conductor is being reduced in section.

FIG. 4 of the drawing illustrates the wire drawing of the composite member through a die. The composite rod or wire 50 to be reduced in diameter comprises a copper core 52, a silver layer 54 and an aluminum sheath 56. The copper core 52 has a diameter D. The wire is pulled through the die 60 having an entrance portion 62 and an exit opening 64 of the die, reducing the wire to the diameter $D_1$. The diameter $D_1$ is slightly less than the diameter D. Ordinarily the cross-sectional area at $D_1$ is substantially less than the cross-sectional area of the copper core before drawing, being at least approximately 5% less than the cross-section of diameter D. When the composite wire is drawn through a die in accordance with the proportions shown in FIG. 4, the aluminum sheath will not strip but the whole wire is reduced in proportion. Thus the core 70 of the reduced wire 68, the silver layer 72 and the aluminum sheath 74 are all reduced in proportion to their original cross-sectional areas 52, 54 and 56.

It will be understood that the above detailed description and drawing are only illustrative and not limiting.

We claim as our invention:

1. In the process of producing a ductile and flexible composite elongated member, comprising a copper core and an aluminum sheath bonded to the exterior surface of the copper core, the steps comprising applying a thin imperforate layer of silver of a thickness of at least 0.005 inch to the exterior surface of a copper body, the thickness of the silver layer being from 1% to 12% of the diameter of the copper body, applying an aluminum sleeve about the copper body, the cross-section of the aluminum sleeve being at least 5% of the cross-section of the copper body, the copper body having a larger cross-sectional area than the sleeve, initially working the assembly of the aluminum sleeve and copper body to reduce the cross section of the aluminum-sleeved assembly to a value less than the cross-sectional area of the copper body alone whereby the aluminum sleeve is drawn into close and intimate contact with the silver layer, thereafter cold drawing the initially worked assembly through at least one die such that the drawn cross section of the aluminum clad assembly is substantially less than the cross section of the copper core portion alone before passage through the die, the drawing producing a metallurgically bonded aluminum sheathed elongated copper core member with an imperforate interposed layer of silver.

2. In the process of producing a ductile and flexible composite elongated member, comprising a copper core and an aluminum sheath bonded to the exterior surface of the copper core, the steps comprising electroplating a thin imperforate layer of silver of a thickness of at least 0.005 inch to the exterior surface of a copper body, the thickness of the silver layer being from 1% to 12% of the diameter of the copper body, applying an aluminum sleeve about the silver plated copper body, the cross-section of the aluminum sleeve being at least 5% of the cross-section of the copper body, the copper body having a larger cross-sectional area than the sleeve, initially cold working the assembly of the aluminum sleeve and copper body to reduce the cross section at least 30% as compared to the cross-sectional area of the copper body alone, whereby the aluminum sleeve is closely and intimately bonded to the silver layer, annealing the worked assembly at a temperature of 350° C. to 500° C., thereafter cold drawing the initially worked assembly through at least one die such that the drawn cross-sectional area of the aluminum clad assembly is substantially less than the cross-sectional area of the copper core portion alone before passage through the die, the drawing producing a metallurgically bonded aluminum sheathed elongated copper core member with an imperforate interposed layer of silver.

3. In the process of producing a ductile and flexible composite elongated member, comprising a copper core and an aluminum sheath bonded to the exterior surface of the copper core, the steps comprising plating an imperforate layer of silver of a thickness of from 0.005 to 0.05 inch upon a copper rod of a diameter of from 0.25 to 2 inches, applying an aluminum tube of an internal diameter slightly greater than the diameter of the silver plated copper rod, the aluminum tube having a wall thickness of from 0.01 to 0.25 inch, the cross section of the tube being at least 5% of the cross-sectional area of the copper rod, initially cold working the assembly to reduce the cross-sectional area of the assembly at least 30% whereby the aluminum tube is drawn into close and intimate contact with the silver plating, annealing the worked assembly for 10 to 20 minutes at 350° C. to 500° C., then cold drawing the initially worked assembly through at least one die such that the drawn cross-sectional area of the aluminum clad assembly is substantially less than the cross-sectional area of the copper core portion alone before passage through the die, the drawing producing a metallurgically bonded aluminum sheathed elongated member.

4. In the process of producing a ductile and flexible composite elongated member, comprising a copper core and an aluminum sheath bonded to the exterior surface of the copper core, the steps comprising plating an imperforate layer of silver of a thickness of from 0.005 to 0.05 inch upon a copper rod of a diameter of from 0.25 to 2 inches, extruding a closely fitting tubular jacket of aluminum about the silver plated copper rod, the tubular jacket having a wall thickness of from 0.01 to 0.25 inch, the cross section of the tubular jacket being at least 5% of the cross-sectional area of the copper rod, initially cold working the assembly to reduce the cross-sectional area of the assembly at least 30% whereby the aluminum tubular jacket is drawn into close and intimate contact with the silver plating, annealing the worked assembly for 10 to 20 minutes at 350° C. to 500° C., then cold drawing the initially worked assembly through at least one die such that the drawn cross-sectional area of the aluminum clad assembly is substantially less than the cross-sectional area of the copper core portion alone before passage through the die, the drawing producing a metallurgically bonded aluminum sheathed elongated member.

5. In the process of producing a ductile and flexible composite elongated member, comprising a copper core and an aluminum sheath bonded to the exterior surface of the copper core, the steps comprising plating an imperforate layer of silver of a thickness of from 0.005 to 0.05 inch upon a copper rod of a diameter of from 0.25 to 2 inches, casting a closely fitting tubular jacket of aluminum about the silver plated copper rod, the cast tubular jacket having a wall thickness of from 0.01 to 0.25 inch, the cross section of the tubular jacket being at least 5% of the cross-sectional area of the copper rod, initially cold working the assembly to reduce the cross-sectional area of the assembly at least 30% whereby the aluminum tubular jacket is drawn into close and intimate contact with the silver plating, annealing the worked assembly for 10 to 20 minutes at 350° C. to 500° C., then cold drawing the initially worked assembly through at least one die such that the drawn cross-sectional area of the aluminum clad assembly is substantially less than the cross-sectional area of the copepr core portion alone before passage through the die, the drawing producing a metallurgically bonded aluminum sheathed elongated member.

References Cited in the file of this patent

UNITED STATES PATENTS

| | | |
|---|---|---|
| 1,575,994 | Laise | Mar. 9, 1926 |
| 2,473,888 | Jordan et al. | June 21, 1949 |
| 2,539,248 | Lynch et al. | Jan. 23, 1951 |
| 2,753,623 | Boessenkool et al. | July 10, 1956 |
| 2,763,058 | McCullough et al. | Sept. 18, 1956 |
| 2,790,656 | Cook | Apr. 30, 1957 |